US012430161B2

(12) United States Patent
Taneja et al.

(10) Patent No.: US 12,430,161 B2
(45) Date of Patent: *Sep. 30, 2025

(54) SUPPORT OF VIRTUAL NETWORK AND NON-VIRTUAL NETWORK CONNECTIVITY ON THE SAME VIRTUAL MACHINE

(71) Applicant: Microsoft Technology Licensing, LLC, Redmond, WA (US)

(72) Inventors: Vishal Taneja, Sammamish, WA (US); Abhishek Shukla, Redmond, WA (US); Parag Sharma, Issaquah, WA (US); Xinyan Zan, Sammamish, WA (US); Kaihua Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,713

(22) Filed: Jun. 1, 2023

(65) Prior Publication Data

US 2023/0315506 A1 Oct. 5, 2023

Related U.S. Application Data

(63) Continuation of application No. 16/664,552, filed on Oct. 25, 2019, now Pat. No. 11,709,694.
(Continued)

(51) Int. Cl.
*G06F 9/455* (2018.01)
*H04L 12/46* (2006.01)
(Continued)

(52) U.S. Cl.
CPC ...... *G06F 9/45558* (2013.01); *H04L 12/4633* (2013.01); *H04L 12/4641* (2013.01);
(Continued)

(58) Field of Classification Search
CPC ........ G06F 9/45558; G06F 2009/4557; G06F 2009/45595; G06F 9/5077; H04L 12/4633;
(Continued)

(56) References Cited

U.S. PATENT DOCUMENTS 10,110,483 B2 * 10/2018 Behringer ............... H04L 45/64
10,476,809 B1 * 11/2019 Daniel ................ G06F 9/45558
(Continued)

OTHER PUBLICATIONS

Communication pursuant to Article 94(3) received in European Application No. 20760629.4, mailed on Nov. 30, 2023, 5 pages.
(Continued)

*Primary Examiner* — Lewis A Bullock, Jr.
*Assistant Examiner* — Kevin X Lu
(74) *Attorney, Agent, or Firm* — Ray Quinney & Nebeker P.C.

(57) ABSTRACT

A hybrid state for a virtual machine (VM) in a cloud computing system enables a VM to communicate with other VMs that belong to a virtual network (VNET VMs) while maintaining connectivity with other VMs that do not belong to the virtual network (non-VNET VMs). A non-VNET VM can be transitioned to a hybrid VM that operates in a hybrid state. The hybrid VM can be assigned a private virtual IP address (VNET address) for communication with other VNET VMs. The hybrid VM can continue to use a physical IP address to communicate with other non-VNET VMs. In this way, the hybrid VM is able to maintain connectivity with other non-VNET VMs during and after migration to the VNET. A network stack can be configured to process data packets that are destined for non-VNET VMs differently from data packets that are destined for VNET VMs.

20 Claims, 10 Drawing Sheets

Related U.S. Application Data

(60) Provisional application No. 62/874,190, filed on Jul. 15, 2019.

(51) Int. Cl.
  *H04L 45/74* (2022.01)
  *H04L 61/5007* (2022.01)

(52) U.S. Cl.
  CPC .......... *H04L 45/74* (2013.01); *H04L 61/5007* (2022.05); *G06F 2009/4557* (2013.01); *G06F 2009/45595* (2013.01)

(58) Field of Classification Search
  CPC . H04L 12/4641; H04L 45/74; H04L 61/2007; H04L 61/2038; H04L 41/0813
  See application file for complete search history.

(56) References Cited

U.S. PATENT DOCUMENTS

| | | | |
|---|---|---|---|
| 11,308,281 B1* | 4/2022 | Craft | G06F 40/284 |
| 2012/0110651 A1* | 5/2012 | Van Biljon | H04L 63/101 709/201 |
| 2017/0366455 A1* | 12/2017 | Pongracz | H04L 45/74 |
| 2018/0176130 A1* | 6/2018 | Banerjee | H04L 61/2557 |
| 2018/0241809 A1* | 8/2018 | Gandhi | G06F 15/17331 |
| 2018/0309718 A1* | 10/2018 | Zuo | H04L 61/2521 |
| 2019/0163538 A1* | 5/2019 | Klein | G06F 9/45558 |
| 2019/0319847 A1* | 10/2019 | Nahar | G06F 9/45558 |
| 2019/0319914 A1* | 10/2019 | Petersen | H04L 61/103 |
| 2020/0092138 A1* | 3/2020 | Tillotson | H04L 12/4633 |
| 2020/0099659 A1* | 3/2020 | Cometto | H04L 67/1001 |
| 2020/0314006 A1* | 10/2020 | Mackie | H04L 61/256 |
| 2020/0344088 A1* | 10/2020 | Selvaraj | H04L 41/0893 |
| 2020/0396172 A1* | 12/2020 | Wang | H04L 47/522 |

OTHER PUBLICATIONS

Communication pursuant to Article 71(3) EPC, received in European Application No. 20760629.4, mailed on Feb. 21, 2025, 8 pages.

* cited by examiner

SUPPORT OF VIRTUAL NETWORK AND NON-VIRTUAL NETWORK CONNECTIVITY ON THE SAME VIRTUAL MACHINE

CROSS-REFERENCE TO RELATED APPLICATIONS

This application is a Continuation of U.S. application Ser. No. 16/664,552, filed on Oct. 25, 2019, which claims the benefit of U.S. Provisional Patent Application Ser. No. 62/874,190, filed Jul. 15, 2019, the entireties of which are incorporated herein by reference.

BACKGROUND

Cloud computing is the delivery of computing services (e.g., servers, storage, databases, networking, software, analytics) over the Internet. Many different types of services may be provided by a cloud computing system, including services based on a software as a service (SaaS) model, services based on a platform as a service (PaaS) model, and services based on infrastructure as a service (IaaS) model.

Broadly speaking, a cloud computing system includes two sections, a front end and a back end, that are in electronic communication with one another via the Internet. The front end includes the interface that users encounter through a client device. The back end includes the resources that deliver cloud-computing services, including processors, memory, storage, and networking hardware. The back end of a cloud computing system typically includes one or more data centers, which may be located in different geographical areas. Each data center typically includes a large number (e.g., hundreds or thousands) of computing devices, which may be referred to as host machines.

At least some of the services that are offered by a cloud computing service provider may utilize virtualization technologies that allow computing resources to be shared by multiple users. For example, virtualization technologies allow a single physical computing device to be shared among multiple users by providing each user with one or more virtual machines hosted by the single physical computing machine. Each such virtual machine may act as a distinct logical computing system, and the various virtual machines may be isolated from one another. As another example, virtualization technologies allow data storage hardware to be shared among multiple users by providing each user with a virtual data store. Each such virtual data store may act as a distinct logical data store, and the various virtual data stores may be isolated from one another.

Virtualization technologies may also be used in the context of computer networking. Network virtualization involves combining hardware and software network resources and network functionality into a software-based administrative entity, which may be referred to as a virtual network (VNET). A cloud computing service provider may enable users (e.g., customers) to create VNETs within a cloud computing system. The use of network virtualization technologies in the context of a cloud computing environment is sometimes referred to as software-defined networking.

Resources may be assigned to VNETs. In this context, the term "resource" may refer to any item that is capable of being managed by a cloud computing system. Some examples of resources include virtual machines, virtual data stores, databases, and web applications. The resources within a VNET may communicate with each other and with other entities that are accessible via the Internet.

Virtual machines (VMs) that are assigned to VNETs may be referred to herein as "VNET VMs." Virtual machines that are not assigned to VNETs may be referred to herein as "non-VNET VMs." In other words, a non-VNET VM has not been assigned to a VNET, whereas a VNET VM has been assigned to a VNET. Generally speaking, VNET VMs are able to communicate with other VNET VMs, and non-VNET VMs are able to communicate with other non-VNET VMs. Currently, however, VNET VMs are unable to communicate directly with non-VNET VMs (and vice versa). Benefits may be realized by techniques that facilitate such communication.

SUMMARY

In accordance with another aspect of the present disclosure, a computer-readable medium is disclosed that includes instructions that are executable by one or more processors to cause a network stack within a host machine to receive a first data packet that includes a first source address and a first destination address. The first source address corresponds to a hybrid virtual machine that is part of a virtual network. The first destination address corresponds to a first destination virtual machine. The computer-readable medium also includes instructions that are executable by one or more processors to determine, based on the first destination address, that the first destination virtual machine belongs to the virtual network. The computer-readable medium also includes instructions that are executable by one or more processors to encapsulate the first data packet based on encapsulation rules that are specified in a first packet processing rule set and receive a second data packet that includes a second source address and a second destination address. The second source address corresponds to the hybrid virtual machine. The second destination address corresponds to a second destination virtual machine. The computer-readable medium also includes instructions that are executable by one or more processors to determine, based on the second destination address, that the second destination virtual machine does not belong to the virtual network. The computer-readable medium also includes instructions that are executable by one or more processors to cause the second data packet to be transmitted to the second destination virtual machine without encapsulation based on a second packet processing rule set that is different from the first packet processing rule set.

The first source address may include a virtual network address. The second source address may include a physical internet protocol (IP) address.

The computer-readable medium may further include additional instructions that are executable by the one or more processors to define a first address space for the virtual network and define a second address space for virtual machines outside of the virtual network. The second address space may be distinct from the first address space and may not overlap with the first address space.

Determining that the first destination virtual machine belongs to the virtual network may include determining that the first destination address is included within the first address space.

Determining that the second destination virtual machine does not belong to the virtual network may include determining that the second destination address is not included within the first address space.

Determining that the second destination virtual machine does not belong to the virtual network may include determining that the second destination address is included within the second address space.

Encapsulating the first data packet forms an encapsulated data packet that may include a header and a payload. The header of the encapsulated data packet may include a header source address and a header destination address. The header source address may include a first physical internet protocol (IP) address. The first physical IP address may be associated with a first host machine that comprises the hybrid virtual machine. The header destination address may include a second physical IP address. The second physical IP address may be associated with a second host machine that includes the second destination virtual machine. The payload of the encapsulated data packet may include the first data packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
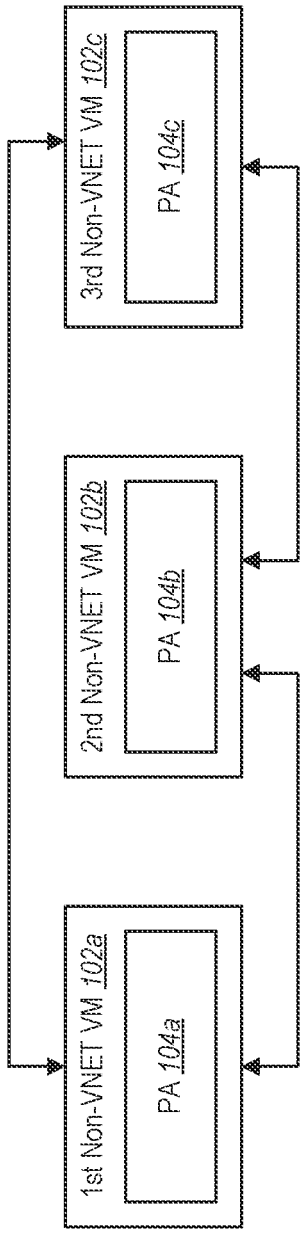
FIG. 1A illustrates an example of a deployment within a cloud computing system that includes a plurality of non-VNET VMs.

As noted above, VNET VMs are currently unable to communicate directly with non-VNET VMs (and vice versa). The present disclosure describes techniques that facilitate such communication. More specifically, the present disclosure is related to a hybrid state for a virtual machine (VM) in a cloud computing system. The hybrid state enables a VM to communicate with both VNET VMs and non-VNET VMs.

In at least some implementations of the techniques disclosed herein, there may be a unique physical IP address associated with each non-VNET VM. In this context, the term "physical IP address" can refer to an IP address that is routable on a physical computer network. Non-VNET VMs can use physical internet protocol (IP) addresses to communicate with each other.

For example, consider two non-VNET VMs: a first non-VNET VM and a second non-VNET VM. The first non-VNET VM can be associated with a first physical IP address, which may be referred to as PA1. The second non-VNET VM can be associated with a second physical IP address, which may be referred to as PA2. Suppose that the first non-VNET VM sends a data packet to the second non-VNET VM. In this example, the source address of the data packet would be PA1, and the destination address of the data packet would be PA2.

In at least some implementations of the techniques disclosed herein, a VNET VM can use a private virtual IP address for communication with other VNET VMs. This private virtual IP address may be referred to herein as a VNET address. VNET addresses can be assigned by customers of a cloud computing provider, in which case a VNET address may be referred to as a customer address (CA). The VNET address (or CA) is unique within the context of the VNET but may not be unique outside of that context. VNET VMs can use VNET addresses to communicate with each other. In addition, encapsulation can be performed so that the physical IP addresses of the host machines on which the VNET VMs are running are also used to facilitate communication between VNET VMs.

For example, consider two VNET VMs: a first VNET VM and a second VNET VM. For purposes of the present example, it will be assumed that the first VNET VM is associated with a first VNET address (e.g., a first customer address), which may be referred to as CA1. It will also be assumed that the second VNET VM is associated with a second VNET address (e.g., a second customer address), which may be referred to as CA2. In addition, it will be assumed that the VNET VMs are running on different host machines. In particular, it will be assumed that the first VNET VM is running on a first host machine with a first physical IP address, which may be referred to as PA1. It will also be assumed that the second VNET VM is running on a second host machine with a second physical IP address, which may be referred to as PA2. Suppose that the first VNET VM sends a data packet to the second VNET VM. The first VNET VM would create a data packet with a source address of CA1 and a destination address of CA2. This data packet would be delivered to a network stack on the first host machine. This network stack would perform encapsulation to create an outer header for the data packet. Within the outer header, the source address would be PA1, and the destination address would be PA2.

As noted above, VNET VMs and non-VNET VMs are currently unable to directly communicate with each other. In other words, although communication between VNET VMs and non-VNET VMs can occur, such communication currently requires at least one intermediate entity (e.g., a load balancer) within the VNET that has a public IP address. A non-VNET VM can communicate with a VNET VM through such an intermediate entity. For example, a non-VNET VM could send a data packet to the intermediate entity, which could then deliver the data packet to the VNET VM. However, a non-VNET VM is currently unable to send a data packet directly to the VNET VM (or vice versa). For example, a non-VNET VM is currently not permitted to send a data packet that is addressed to the VNET address (e.g., the customer address) of the VNET VM. This is at least partially because the address spaces of VNET VMs and non-VNET VMs can overlap. In other words, there can be some overlap between the VNET addresses (e.g., customer addresses) that are associated with VNET VMs and the physical IP addresses that are associated with non-VNET VMs.

There are, however, various reasons why it can be desirable for VNET VMs and non-VNET VMs to be able to directly communicate with each other. As one example, consider a deployment of non-VNET VMs that is being migrated to a VNET. Because it is desirable for the migration to occur with minimal interruption (ideally no interruption) of service, the migration can occur on a gradual basis. For example, just one VM (or a few VMs) can be migrated at a time. This means that, within the deployment, there could be (i) non-VNET VMs that have been migrated to the VNET, (ii) non-VNET VMs that have not yet been migrated to the VNET, and (iii) newly created VMs within the VNET (which may be referred to as "pure" VNET VMs). It can be desirable for (i) to be able to communicate with (ii), and also for (i) to be able to communicate with (iii).

One aspect of the present disclosure makes such communication possible by creating a hybrid state for a VM that was initially created as a non-VNET VM but has been migrated to a VNET. A VM that is operating in the hybrid state can communicate with other VMs in the VNET as well as non-VNET VMs that have not yet been migrated to the VNET.

FIG. 1A illustrates an example of a deployment within a cloud computing system that includes three non-VNET VMs: a first non-VNET VM 102a, a second non-VNET VM 102b, and a third non-VNET VM 102c. The first non-VNET VM 102a includes a physical address (PA) 104a, the second non-VNET VM 102b includes a PA 104b, and the third non-VNET VM 102c includes a PA 104c.

For purposes of the present example, it will be assumed that all of the non-VNET VMs 102a-c shown in FIG. 1A are able to communicate with each other. The non-VNET VMs 102a-c use the PAs 104a-c for such communication. For example, suppose that the first VM 102a sends a data packet to the second VM 102b. The source address of that data packet would be the PA 104a of the first VM 102a, and the destination address of that data packet would be the PA 104b of the second VM 102b.

Figure 1B:
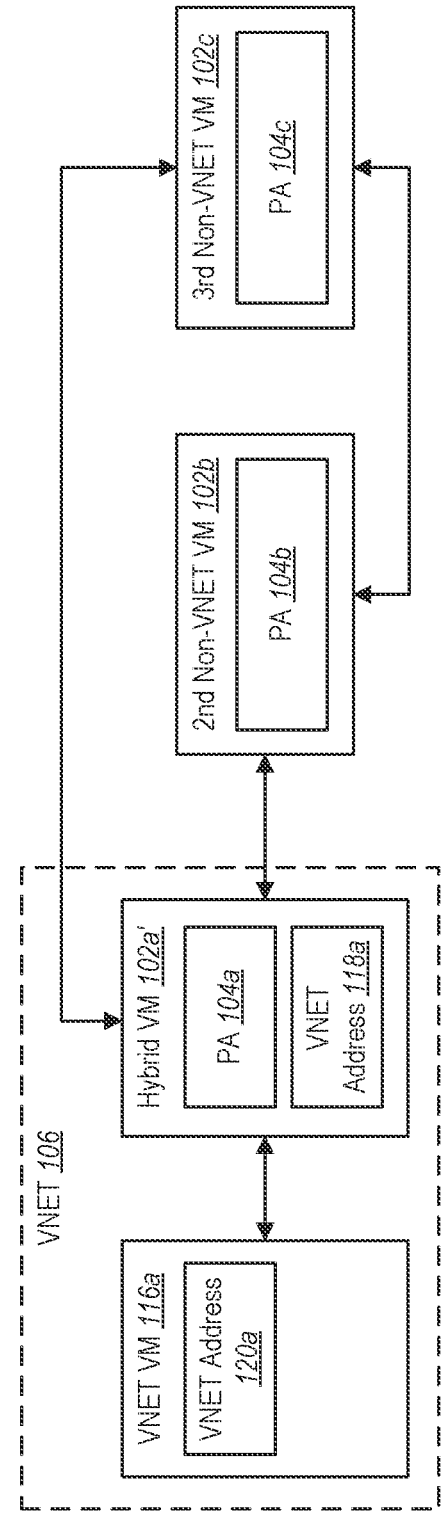
FIG. 1B illustrates the deployment of FIG. 1A after one of the non-VNET VMs has been migrated to a VNET and transitioned to a hybrid VM that operates in a hybrid state.

Referring to both FIG. 1A and FIG. 1B, suppose that this deployment of non-VNET VMs 102a-c is going to be migrated to a VNET 106. This migration can occur gradually (e.g., one VM at a time). Suppose that the first non-VNET VM 102a is migrated first. FIG. 1B illustrates a point in time at which the first non-VNET VM 102a has been migrated to the VNET 106, but the second non-VNET VM 102b and the third non-VNET VM 102c have not yet been migrated to the VNET 106. The first non-VNET VM 102a shown in FIG. 1A has been changed to a hybrid VM 102a' in FIG. 1B. The hybrid VM 102a' operates in a hybrid state that enables the hybrid VM 102a' to continue to communicate with the second non-VNET VM 102b and the third non-VNET VM 102c while those VMs 102b—c remain outside of the VNET 106. The hybrid state also allows the hybrid VM 102a' to communicate with other VNET VMs (i.e., other VMs within the VNET 106), such as the VNET VM 116a shown in FIG. 1B.

In the hybrid state, the hybrid VM 102a' continues to use its physical address (the PA 104a) to communicate with the second non-VNET VM 102b and the third non-VNET VM 102c. However, the hybrid VM 102a' is assigned a VNET address 118a to use for communication with other VMs within the VNET 106, such as the VNET VM 116a shown in FIG. 1B. The VNET address 118a is unique within the context of the VNET 106 but may not be unique outside of that context. In some implementations, the VNET address 118a may be referred to as a customer address (CA), because the VNET address 118a can be assigned by a customer of a cloud computing provider that administers the cloud computing system.

A VNET VM that is assigned to the VNET 106 when the VNET VM is initially created (instead of being created outside of the VNET 106 and then migrated to the VNET 106) may be referred to as a "pure" VNET VM. The VNET VM 116a shown in FIG. 1B can be a pure VNET VM. If the VNET VM 116a is a "pure" VNET VM, the VNET VM 116a is not assigned a physical IP address. Instead, the VNET VM 116a can be assigned a VNET address 120a that is unique within the context of the VNET 106 but may not be unique outside of that context. The hybrid VM 102a' uses its VNET address 118a to communicate with the VNET VM 116a.

Thus, while operating in the hybrid state, the hybrid VM 102a' can be configured to send data packets to (and receive data packets from) the non-VNET VMs 102b—c. The hybrid VM 102a' can also be configured to send data packets to (and receive data packets from) other VMs within the VNET 106, such as the VNET VM 116a.

Figure 1C:
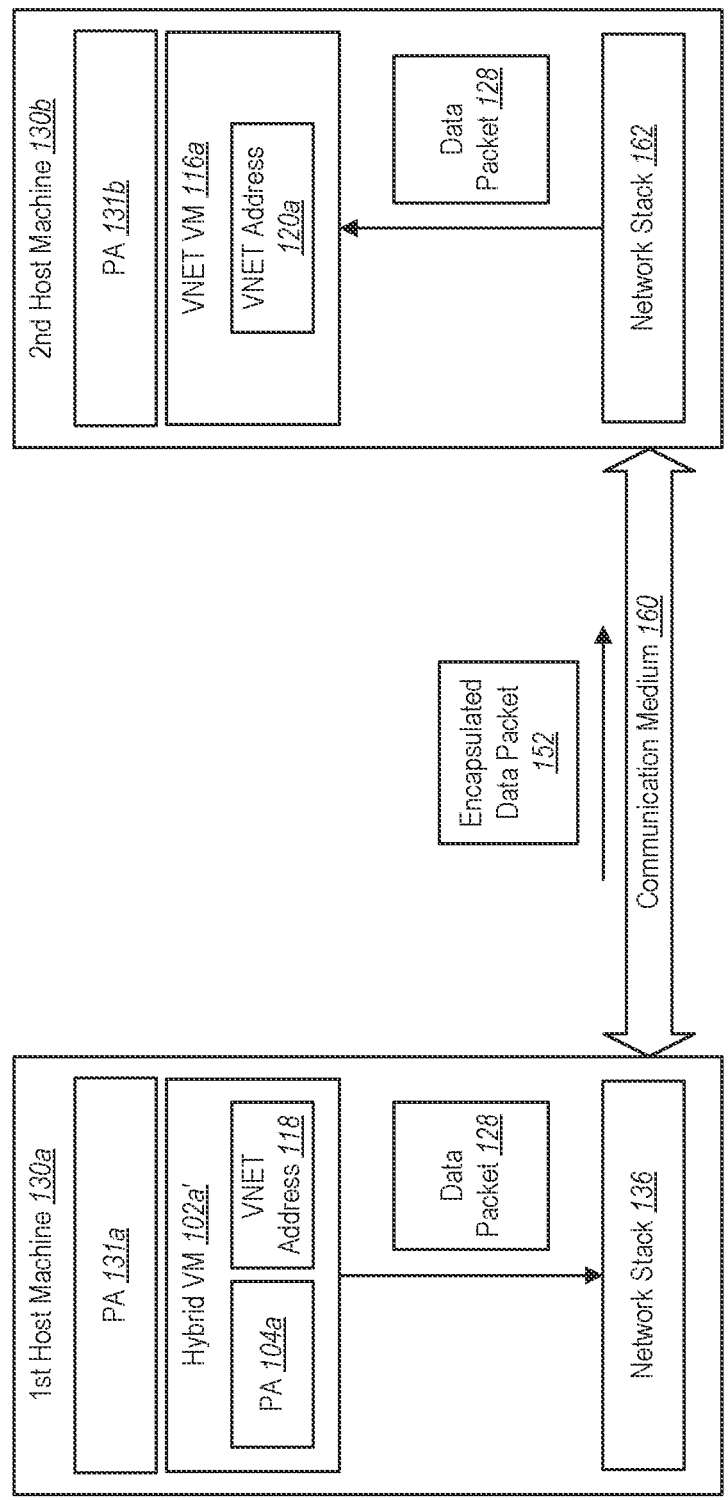
FIG. 1C illustrates an example showing how a data packet can be sent from a hybrid VM to a VNET VM.
Figure 1D:
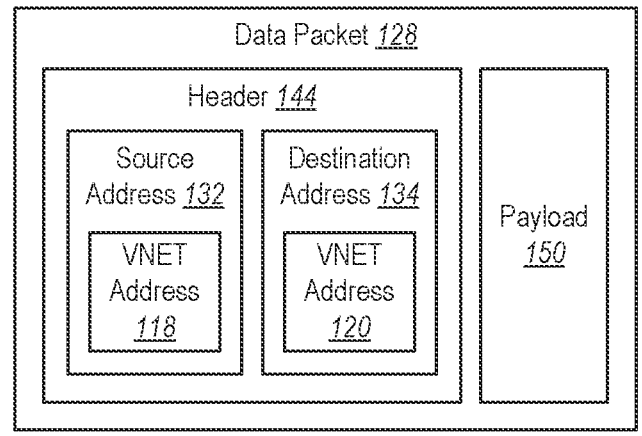
FIG. 1D illustrates an example of a data packet that a hybrid VM can send to a VNET VM.
Figure 1E:
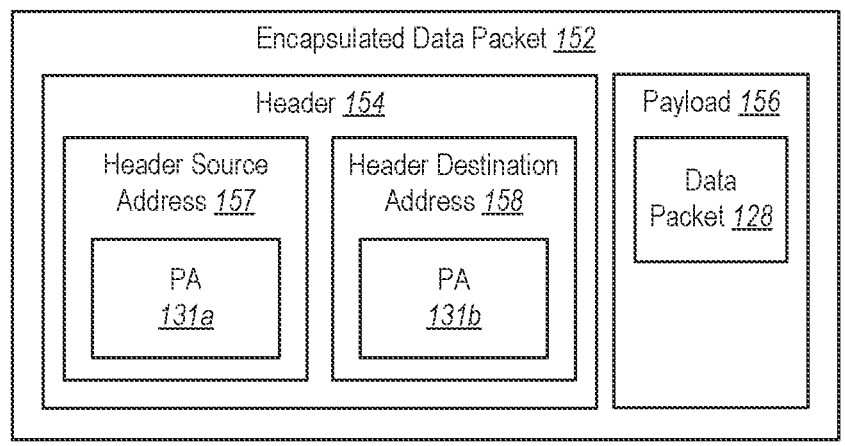
FIG. 1E illustrates an example of the data packet in FIG. 1D after encapsulation has been performed.

FIGS. 1C-1E illustrate an example showing how a data packet 128 can be sent from the hybrid VM 102a' to the VNET VM 116a. For purposes of the present example, it will be assumed that the hybrid VM 102a' and the VNET VM 116a are running on different host machines. In particular, it will be assumed that the hybrid VM 102a' is running on a first host machine 130a, and the VNET VM 116a is running on a second host machine 130b. The first host machine 130a has a physical IP address (PA) 131a, and the second host machine 130b has a different PA 131b.

Referring briefly to FIG. 1D, the data packet 128 includes a header 144 and a payload 150. As indicated above, when operating in the hybrid state, the hybrid VM 102a' uses a VNET address 118a for communication with other VMs within the VNET 106. Thus, when the hybrid VM 102a' creates a data packet 128 to send to the VNET VM 116a, the hybrid VM 102a' uses its VNET address 118a as the source address 132 in the header 144 of the data packet 128. The hybrid VM 102a' uses the VNET address 120a of the VNET VM 116a as the destination address 134 in the header 144 of the data packet 128.

Referring again to FIG. 1C, after the hybrid VM 102a' creates the data packet 128, the data packet 128 is delivered to a network stack 136 on the first host machine 130a. As will be explained in greater detail below, the network stack 136 can be configured to process data packets that are destined for non-VNET VMs (e.g., non-VNET VMs 102b—c) differently from data packets that are destined for VNET VMs (e.g., VNET VM 116a). Because the data packet 128 shown in FIG. 1C is destined for a VNET VM 116a, the network stack 136 performs encapsulation to form an encapsulated data packet 152. As shown in FIG. 1E, the encapsulated data packet 152 includes a header 154 and a payload 156 that includes the data packet 128. The header 154 of the encapsulated data packet 152 includes a source address 157 and a destination address 158. The source address 157 in the header 154 may be referred to herein as a header source address 157, and the destination address 158 in the header 154 may be referred to herein as a header destination address 158. In the depicted example, the header source address 157 is the physical IP address of the first host machine 130a (i.e., PA 131a), and the header destination address 158 is the physical IP address of the second host machine 130b (i.e., PA 131b).

The network stack 136 on the first host machine 130a causes the encapsulated data packet 152 to be transmitted over a physical communication medium 160 to the second host machine 130b. A network stack 162 on the second host machine 130b receives the encapsulated data packet 152, strips away the header 154, and delivers the data packet 128 to the VNET VM 116a.

In the example shown in FIG. 1C, it is assumed that the hybrid VM 102a' and the VNET VM 116a are running on different host machines 130a-b. However, this is not necessary. In an alternative example, the hybrid VM 102a' can send a data packet to a VNET VM that is running on the same host machine as the hybrid VM 102a' (e.g., the first host machine 130a in the example shown in FIG. 1C). In this case, the data packet can still be delivered to the network stack 136. However, it would not be necessary for encapsulation to be performed. The network stack 136 could simply deliver the data packet to the intended VNET VM on the first host machine 130a.

Figure 1F:
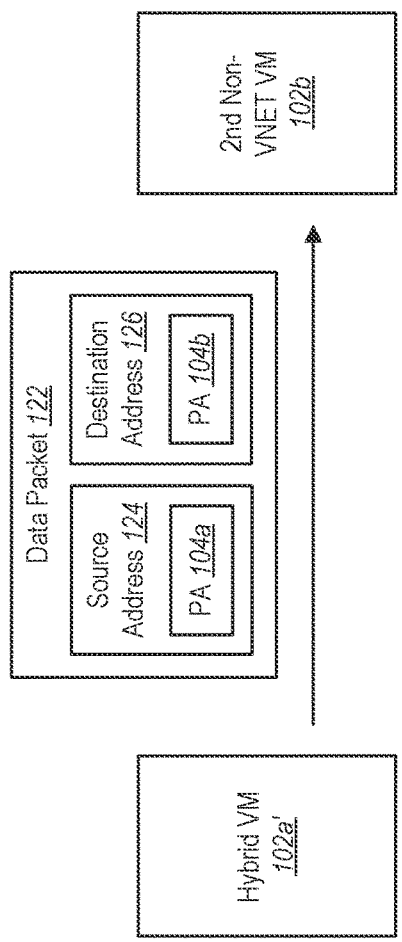
FIG. 1F illustrates an example of a data packet that a hybrid VM can send to a non-VNET VM.

FIG. 1F illustrates an example of a data packet 122 that can be sent from the hybrid VM 102a' to a non-VNET VM, such as the second non-VNET VM 102b. As indicated above, in the hybrid state the hybrid VM 102a' continues to use its physical address (the PA 104a) to communicate with the non-VNET VMs 102b—c. Thus, in the present example, the source address 124 of the data packet 122 is the PA 104a of the hybrid VM 102a', and the destination address 126 of the data packet 122 is the PA 104b of the second non-VNET VM 102b.

The hybrid VM 102a' and the second non-VNET VM 102b can be running on the same host machine or on different host machines. If the hybrid VM 102a' and the second non-VNET VM 102b are running on different host machines, the data packet 122 can traverse the same basic path as the data packet 128 shown in FIG. 1C (e.g., from the hybrid VM 102a' to the network stack 136 on the first host machine 130a, across the communication medium 160 to a network stack on the host machine on which the second non-VNET VM 102b is running). For the sake of simplicity, however, those details are omitted from FIG. 1F.

Figure 1G:
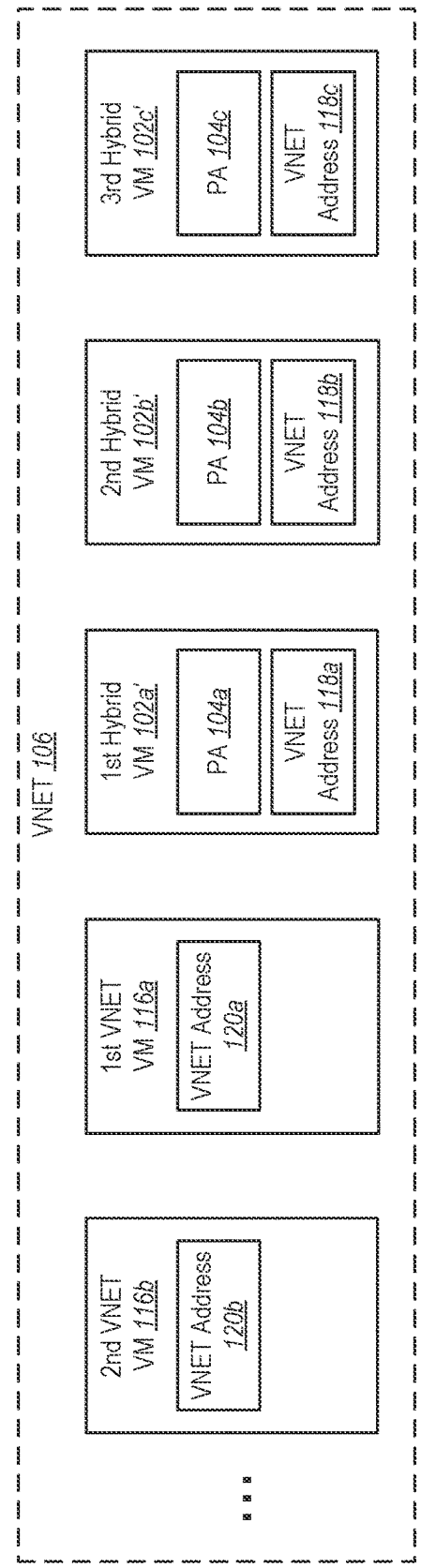
FIG. 1G illustrates the deployment of FIG. 1A after the plurality of non-VNET VMs have been migrated to a VNET and transitioned to hybrid VMs.

As indicated above, the deployment of non-VNET VMs 102a-c shown in FIG. 1A can be migrated to a VNET 106. FIG. 1G illustrates various entities within the VNET 106 after this migration has occurred. The first non-VNET VM 102a, second non-VNET VM 102b, and third non-VNET VM 102c shown in FIG. 1A have been transitioned to a first hybrid VM 102a', second hybrid VM 102b', and a third hybrid VM 102c' in FIG. 1G. The hybrid VMs 102a', 102b', 102c', maintain their physical addresses (PA 104a, PA 104b, PA 104c). In addition, the hybrid VMs 102a', 102b', 102c' are assigned VNET addresses. In particular, the first hybrid VM 102a' is assigned a first VNET address 118a, the second hybrid VM 102b' is assigned a second VNET address 118b, and the third hybrid VM 102c' is assigned a third VNET address 118c.

FIG. 1G also shows the VNET with a plurality of VNET VMs, including a first VNET VM 116a and a second VNET VM 116b. The first VNET VM 116a is assigned a first VNET address 120a, and the second VNET VM 116b is assigned a second VNET address 120b. The VNET VMs 116a, 116b may be "pure" VNET VMs. In some embodiments, the VNET VMs 116a, 116b may be created after all of the non-VNET VMs 102a, 102b, 102c have been migrated to the VNET 106 and transitioned to hybrid VMs 102a', 102b', 102c'.

To make it possible for a particular VM to operate in the hybrid state, the host machine on which the VM is running can include a network stack that is configured to process data packets that are destined for non-VNET VMs differently from data packets that are destined for VNET VMs. To facilitate this, one or more rule sets can be configured in the network stack of the host machine on which the VM is running. In this context, the term "rule" can refer to one or more actions that are performed in response to one or more conditions being satisfied. The term "rule set" can refer to a single rule or a plurality of rules. In some implementations, the network stack can include at least two different rule sets: a first rule set for processing data packets that are sent to (or received from) VNET VMs, and a second rule set for processing data packets that are sent to (or received from) non-VNET VMs.

Figure 2A:
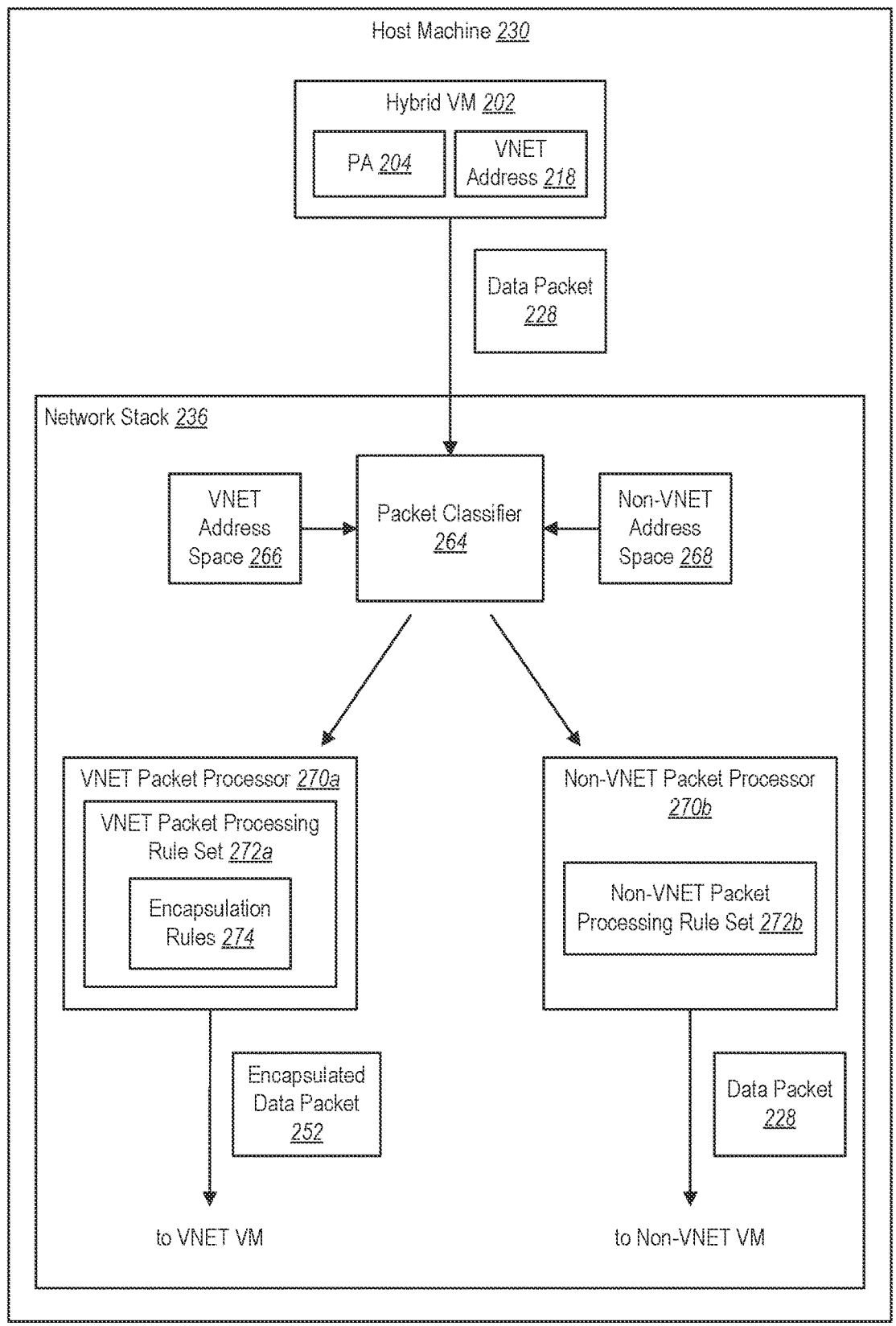
FIG. 2A illustrates an example of a network stack that is configured to implement various packet processing rule sets.

FIG. 2A illustrates an example of a network stack 236 that is configured to implement various packet processing rule sets. The network stack 236 is included on a host machine 230. A hybrid VM 202 is running on the host machine 230. The hybrid VM 202 belongs to a VNET and therefore has a VNET address 218. The hybrid VM 202 uses the VNET address 218 for communicating with other VMs within the VNET. The hybrid VM 202 also includes a physical IP address (PA) 204 that it uses to communicate with non-VNET VMs.

The hybrid VM 202 creates a data packet 228 to be sent to another VM, which can be a non-VNET VM or a VNET VM. The network stack 236 receives the data packet 228 from the hybrid VM 202. The network stack 236 includes a component that may be referred to herein as a packet classifier 264. The packet classifier 264 is configured to determine whether the data packet 228 is going to be sent to a non-VNET VM or to a VNET VM. To make this determination, the packet classifier 264 evaluates the destination address that is included in the header of the data packet 228. More specifically, the packet classifier 264 compares the destination address of the data packet 228 to an address space 266 corresponding to the VNET to which the hybrid VM 202 belongs and selects a rule set for processing the data packet 228 based on the comparison.

More specifically, in the depicted example, the VNET addresses that are used for VNET VMs are distinct from the physical IP addresses that are used for non-VNET VMs. In other words, the address space 266 of VNET VMs is distinct from and does not overlap with the address space 268 of non-VNET VMs. Thus, by evaluating the destination address that is included in the header of the data packet 228, the packet classifier 264 is able to determine whether the data packet 228 is being sent to a VNET VM or to a non-VNET VM. If the destination address of the data packet 228 falls within the address space 266 of VNET VMs, the packet classifier 264 determines that the data packet 228 is being sent to a VNET VM. If, however, the destination address of the data packet 228 falls within the address space 268 of non-VNET VMs, the packet classifier 264 determines that the data packet 228 is being sent to a non-VNET VM.

As noted above, data packets that are being sent to VNET VMs are processed differently than data packets that are being sent to non-VNET VMs. The network stack 236 is shown with a component that is configured to process data packets that are being sent to VNET VMs. This component may be referred to as a VNET packet processor 270a. The network stack 236 is also shown with a component that is configured to process data packets that are being sent to non-VNET VMs. This component may be referred to as a non-VNET packet processor 270b. The VNET packet processor 270a processes data packets in accordance with a rule set that may be referred to as a VNET packet processing rule set 272a. The non-VNET packet processor 270b processes data packets in accordance with a rule set that may be referred to as a non-VNET packet processing rule set 272b.

If the packet classifier 264 determines that the destination address of the data packet 228 falls within the VNET address space 266, then the VNET packet processor 270a processes the data packet 228 based on the VNET packet processing rule set 272a. If, however, the packet classifier 264 determines that the destination address of the data packet 228 falls within the non-VNET address space 268, then the non-VNET packet processor 270b processes the data packet 228 based on the non-VNET packet processing rule set 272b.

In some implementations, the VNET packet processing rule set 272a can include one or more rules 274 specifying how encapsulation should be performed on the data packet 228. These rules 274 may be referred to herein as encapsulation rules 274. Thus, if the packet classifier 264 determines that the destination address of the data packet 228 falls within the VNET address space 266 and the data packet 228 is processed in accordance with the VNET packet processing rule set 272a, the data packet 228 can be encapsulated in accordance with the encapsulation rules 274. This results in the creation of an encapsulated data packet 252. The encapsulated data packet 252 can be similar to the encapsulated data packet 152 shown in FIG. 1E. For example, the encapsulated data packet 252 can include a header that includes a source address and a destination address. The source address can be the physical IP address of the host machine 230 on which the hybrid VM 202 is running. The destination address can be the physical IP address of the host machine on which the destination VM (i.e., the VM to which the data packet 228 is being sent) is running. The data packet 228 created by the hybrid VM 202 can be included in the payload of the encapsulated data packet 252.

In some implementations, the non-VNET packet processing rule set 272b does not include any encapsulation rules. In other words, the non-VNET packet processing rule set 272b can permit a data packet 228 to be transmitted to a destination VM without encapsulation. Thus, if the packet classifier 264 determines that the destination address of the data packet 228 falls within the non-VNET address space 268, the unencapsulated data packet 228 can simply be sent to the destination VM.

Figure 2B:
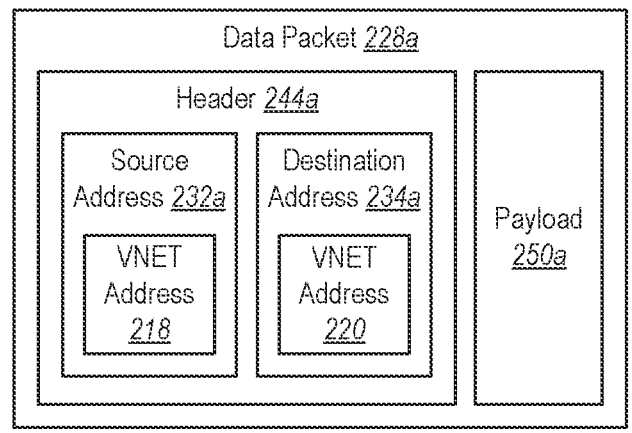
FIG. 2B illustrates an example of a data packet that the hybrid VM in the example shown in FIG. 2A can send to a VNET VM.

FIG. 2B illustrates an example of a data packet 228a that can be sent by the hybrid VM 202 and processed by the network stack 236 in the example shown in FIG. 2A. The data packet 228a shown in FIG. 2B is destined for a VNET VM (i.e., for another VM within the VNET to which the hybrid VM 202 belongs). The data packet 228a includes a header 244a and a payload 250a. The header 244a includes a source address 232a and a destination address 234a.

The source address 232a corresponds to the hybrid VM 202. As discussed above, the hybrid VM 202 includes two different addresses, a PA 204 and a VNET address 218. Because the data packet 228a is being sent to a VNET VM, the source address 232a includes the VNET address 218 of the hybrid VM 202.

The destination address 234a corresponds to the destination VM. Because the data packet 228a shown in FIG. 2B is destined for a VNET VM, the destination address 234a includes a VNET address 220 corresponding to the VNET VM.

The data packet 228a can be processed by the network stack 236 in the following manner. The packet classifier 264 can determine, based on the destination address 234a, that the destination VM is part of the same VNET to which the hybrid VM 202 belongs. More specifically, the packet classifier 264 can compare the destination address 234a (i.e., the VNET address 220) to the VNET address space 266 and determine that the destination address 234a is included within the VNET address space 266.

Based on determining that the destination VM is part of the same VNET to which the hybrid VM 202 belongs, the data packet 228a can be processed by the VNET packet processor 270a. More specifically, the VNET packet processor 270a can process the data packet 228a in accordance with the VNET packet processing rule set 272a. This can include encapsulating the data packet 228a in accordance with one or more encapsulation rules 274 to form an encapsulated data packet 252.

Figure 2C:
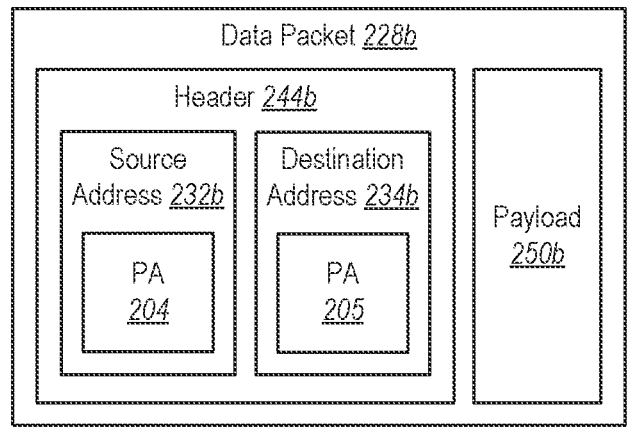
FIG. 2C illustrates an example of a data packet that the hybrid VM in the example shown in FIG. 2A can send to a non-VNET VM.

FIG. 2C illustrates another example of a data packet 228b that can be sent by the hybrid VM 202 and processed by the network stack 236 in the example shown in FIG. 2A. The data packet 228b shown in FIG. 2C is destined for a non-VNET VM (i.e., for a VM that is not part of the VNET to which the hybrid VM 202 belongs). The data packet 228b includes a header 244b and a payload 250b. The header 244b includes a source address 232b and a destination address 234b.

The source address 232b corresponds to the hybrid VM 202. Because the data packet 228b is being sent to a non-VNET VM, the source address 232b is the PA 204 of the hybrid VM 202.

The destination address 234b corresponds to the destination VM. Because the data packet 228b shown in FIG. 2C is destined for a non-VNET VM, the destination address 234b includes a PA 205 corresponding to the non-VNET VM.

The data packet 228b can be processed by the network stack 236 in the following manner. The packet classifier 264 can determine, based on the destination address 234b, that the destination VM is not part of the same VNET to which the hybrid VM 202 belongs. For example, the packet classifier 264 can compare the destination address 234b (i.e., the PA 205) to the VNET address space 266 and determine that the destination address 234b is not included within the VNET address space 266. As another example, the packet classifier 264 can compare the destination address 234b to the non-VNET address space 268 and determine that the destination address 234b is included within the non-VNET address space 268.

Based on determining that the destination VM is not part of the same VNET to which the hybrid VM 202 belongs, the data packet 228b can be processed by the non-VNET packet processor 270b. More specifically, the non-VNET packet processor 270b can process the data packet 228b in accordance with the non-VNET packet processing rule set 272b. Thus, the data packet 228b can be transmitted to the destination VM without encapsulation.

Figure 3:
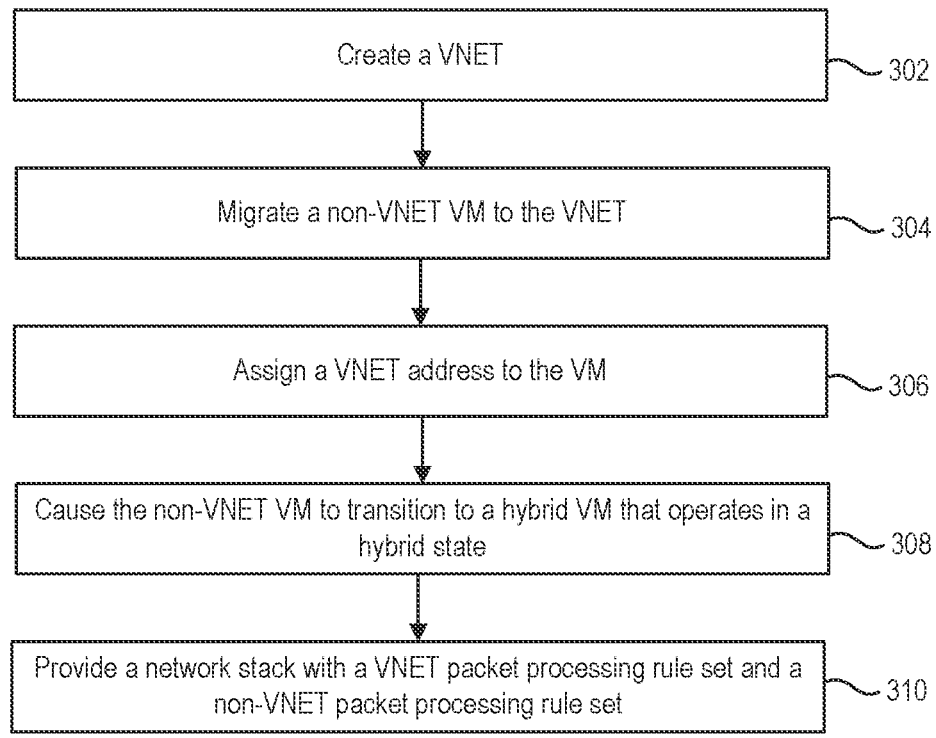
FIG. 3 illustrates an example of a method that can be performed by one or more system-level entities within a cloud computing system in order to transition a single non-VNET VM to a VNET.

FIG. 3 illustrates an example of a method 300 for facilitating communication between non-VNET VMs 102a-c and VNET VMs 116a-b in accordance with the present disclosure. The method 300 can be implemented by one or more system-level entities within a cloud computing system, such as a fabricator and/or a data center controller. The method 300 will be described in relation to the examples shown in FIGS. 1A-G and FIGS. 2A-C.

The method 300 includes creating 302 a VNET 106 and migrating 304 a non-VNET VM 102a to the VNET 106. The action of migrating 304 the non-VNET VM 102a to the VNET 106 can include assigning 306 a VNET address 118a to the VM 102a. The VNET address 118a enables the VM 102a to communicate with other VMs in the VNET 106 (e.g., the VNET VM 116a).

The method 300 also includes causing 308 the non-VNET VM 102a to transition to a hybrid VM 102a' that operates in a hybrid state. Advantageously, the non-VNET VM 102a/ hybrid VM 102a' does not lose connectivity with other non-VNET VMs 102b—c during this transition. As discussed above, the non-VNET VM 102a is assigned a physical IP address (PA) 104a. In the hybrid state, the hybrid VM 102a' continues to use the PA 104a to communicate with the other non-VNET VMs 102b—c.

The method 300 also includes providing 310 a network stack 236 with a VNET packet processing rule set 272a for processing data packets that are being sent to VNET VMs, and a non-VNET packet processing rule set 272b for processing data packets that are being sent to non-VNET VMs. As described above, the VNET packet processing rule set 272a can be configured to process data packets corresponding to a VNET address space 266 that has been defined for the VNET 106. The non-VNET packet processing rule set 272b can be configured to process data packets corresponding to a non-VNET address space 268 that is distinct from and does not overlap with the VNET address space 266.

Figure 4:
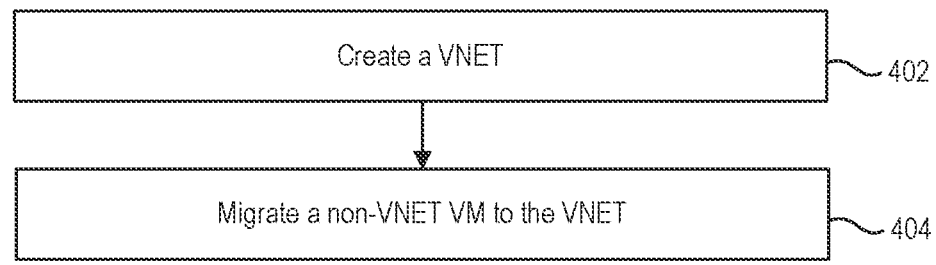
FIG. 4 illustrates an example of a method that can be performed by one or more system-level entities within a cloud computing system in order to transition a plurality of non-VNET VMs to a VNET.

FIG. 4 illustrates another example of a method 400 for facilitating communication between non-VNET VMs 102a-c and VNET VMs 116a-b in accordance with the present disclosure. The method 400 can be implemented by one or more system-level entities within a cloud computing system, such as a fabricator and/or a data center controller. The method 400 will be described in relation to the examples shown in FIGS. 1A-G and FIGS. 2A-C.

The method 400 includes migrating 402 a plurality of non-VNET VMs 102a-c to a VNET 106 and causing the plurality of non-VNET VMs 102a-c to transition to hybrid VMs 102a'— c' that operate in a hybrid state. Some or all of the actions described above in connection with the method 300 shown in FIG. 3 may be performed for each of the non-VNET VMs 102a-c.

The method 400 also includes deploying 404 a plurality of "pure" VNET VMs 116a-b within the VNET 106. As discussed above, the pure VNET VMs 116a-b can be assigned to the VNET 106 when the VNET VMs 116a-b are initially created (instead of being created outside of the VNET 106 and then migrated to the VNET 106). In some embodiments, the pure VNET VMs 116a-b can be deployed after the plurality of non-VNET VMs 102a-c have been migrated to the VNET 106 and transitioned to hybrid VMs 102a'—c'.

Figure 5:
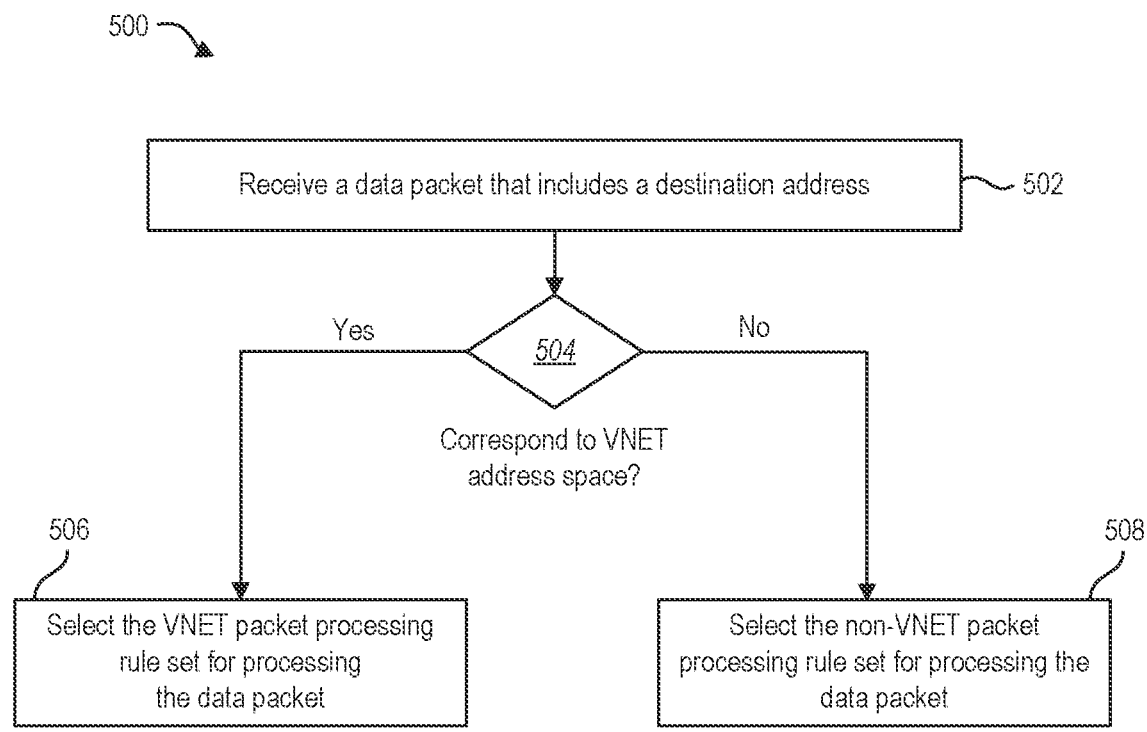
FIG. 5 illustrates an example of a method that can be performed by a network stack running on a host machine within a cloud computing system to facilitate communication between non-VNET VMs and VNET VMs.

FIG. 5 illustrates another example of a method 500 for facilitating communication between non-VNET VMs 102a-c and VNET VMs 116a-b in accordance with the present disclosure. The method 500 can be implemented by a network stack 236 running on a host machine 230 within a cloud computing system. The method 500 will be described in relation to the examples shown in FIGS. 1A-G and FIGS. 2A-C.

As a prerequisite to the method 500, a VNET address space 266 and a non-VNET address space 268 can be defined. The VNET address space 266 and the non-VNET address space 268 can be defined so that they are distinct from and do not overlap with one another.

The method 500 includes receiving 502 a data packet 228. The data packet 228 includes, among other things, a destination address. The destination address can be used to determine 504 whether the data packet 228 corresponds to the VNET address space 266. For example, the destination address of the data packet 228 can be compared to the VNET address space 266 and/or to the non-VNET address space 268.

If it is determined 504 that the data packet 228 corresponds to the VNET address space 266, then the VNET packet processing rule set 272a can be selected 506 for processing the data packet 228. If, however, it is determined 504 that the data packet 228 does not correspond to the VNET address space 266, then the non-VNET packet processing rule set 272b can be selected 508 for processing the data packet 228.

Figure 6:
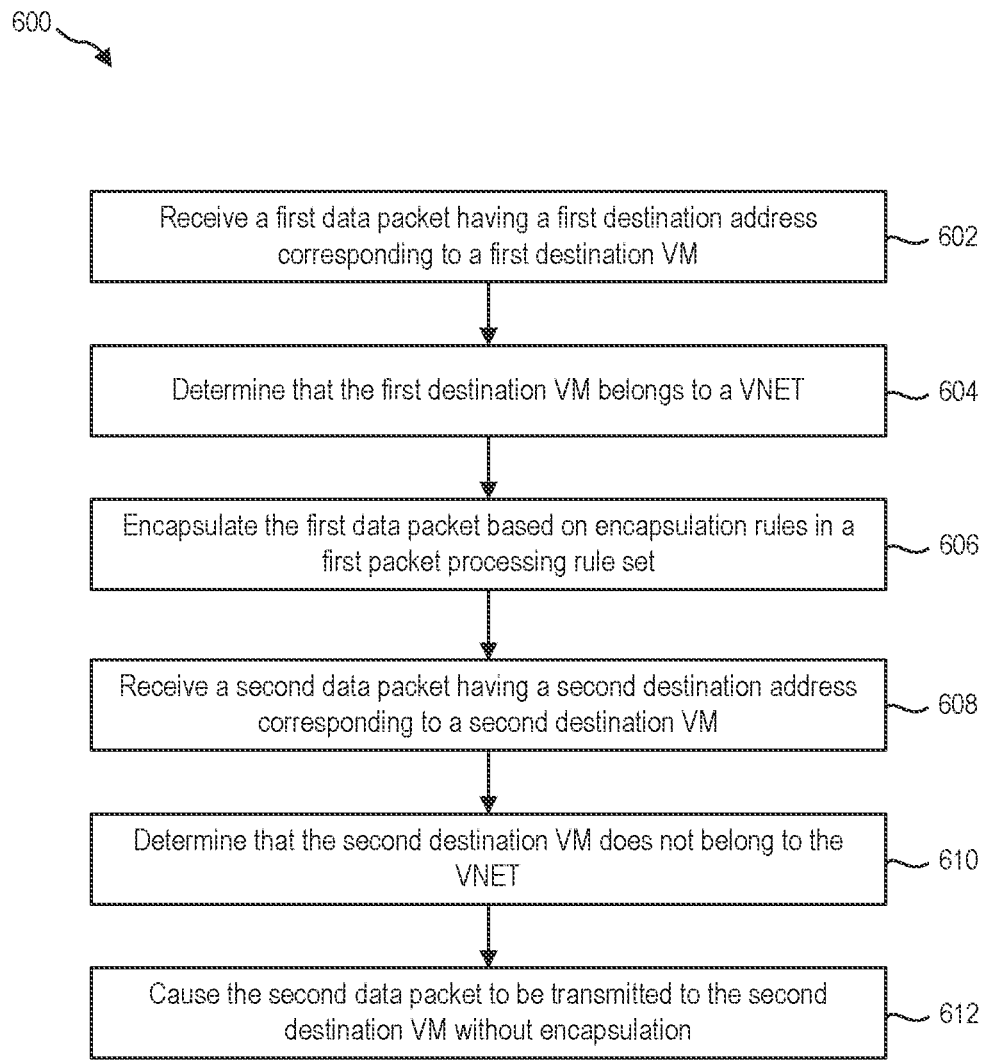
FIG. 6 illustrates an example of a method that can be performed by a network stack running on a host machine within a cloud computing system to process data packets.

FIG. 6 illustrates an example of a method 600 that can be implemented by a network stack 236 on a host machine 230 that includes a hybrid VM 202. The method 600 will be described in relation to the example shown in FIGS. 2A-C.

The method 600 includes receiving 602 a first data packet 228a and determining 604, based on the destination address 234a of the first data packet 228a, that the destination VM is part of the VNET to which the hybrid VM 202 belongs. In other words, the method 600 includes determining 604 that the intended recipient of the first data packet 228a is a VNET VM. In response to determining 604 that the destination VM is a VNET VM, the method 600 also includes processing 606 the first data packet 228a in accordance with a VNET packet processing rule set 272a.

The method 600 also includes receiving 608 a second data packet 228b and determining 610, based on the destination address 234b of the second data packet 228b, that the destination VM is not part of the VNET to which the hybrid VM 202 belongs. In other words, the method 600 includes determining 610 that the intended recipient of the second data packet 228b is a non-VNET VM. In response to determining 610 that the destination VM is a non-VNET VM, the method 600 also includes processing 612 the second data packet 228b in accordance with a non-VNET packet processing rule set 272b.

Figure 7:
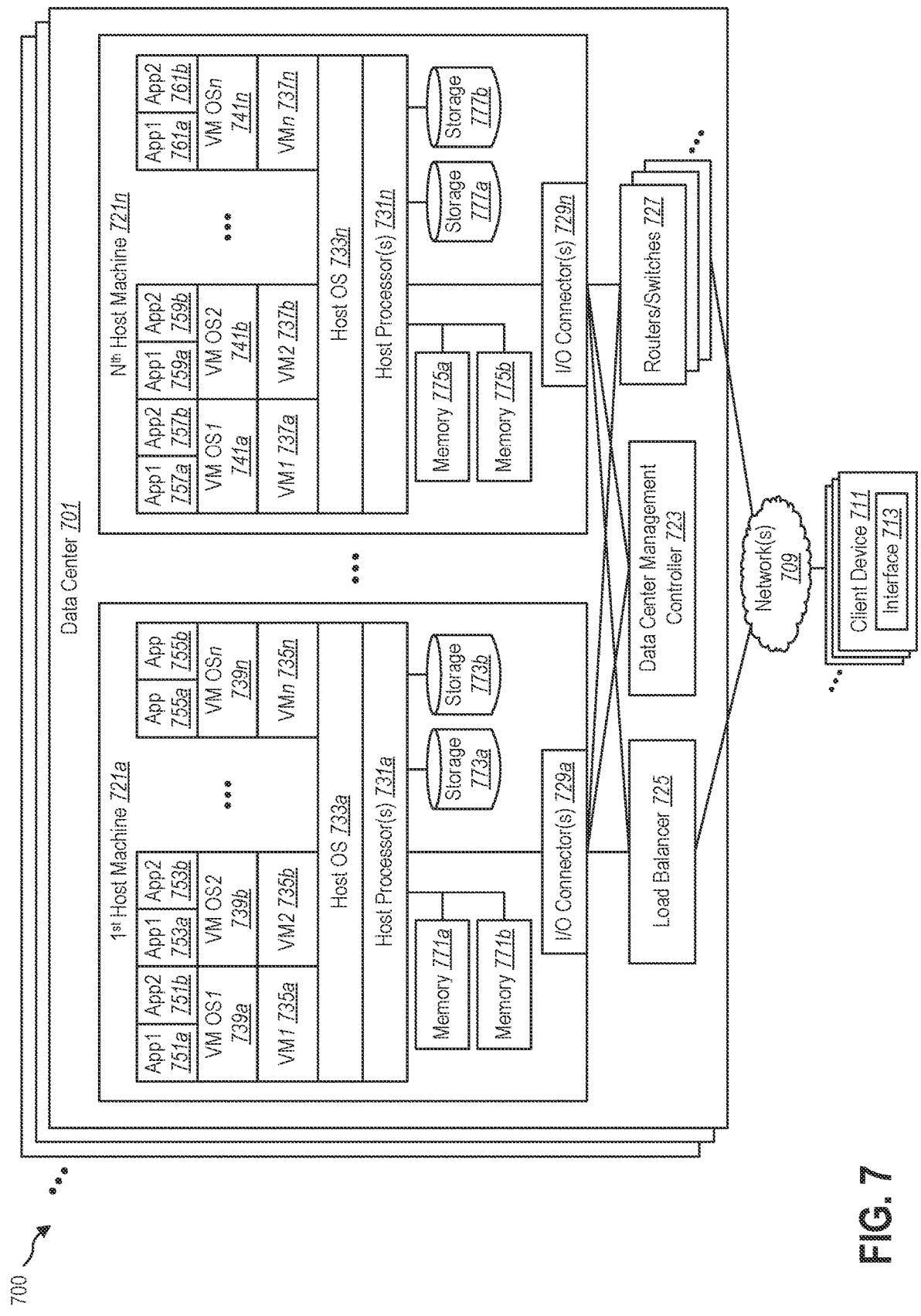
FIG. 7 illustrates an example of certain components that can be utilized in a cloud computing system.

FIG. 7 illustrates an example of certain components that can be utilized in a cloud computing system 700. Broadly speaking, the cloud computing system 700 includes two sections, a front end and a back end, that are in electronic communication with one another via one or more computer networks 709 (typically including the Internet). The front end of the cloud computing system 700 includes an interface 713 that users encounter through a client device 711. The back end of the cloud computing system 700 includes the resources that deliver cloud-computing services.

More specifically, the back end of the cloud computing system 700 includes a plurality of data centers 701. A particular data center 701 includes a plurality of host machines 721a-n, including a first host machine 721a and an Nth host machine 721n. The host machines 721a-n can alternatively be referred to as servers. A data center management controller 723 performs management operations with respect to the host machines 721a-n. A load balancer 725 distributes requests and workloads over the host machines 721a-n to prevent a situation where a single host machine becomes overwhelmed and also to maximize available capacity and performance of the resources in the data center 701. A plurality of routers/switches 727 support data traffic between the host machines 721a-n, and also between the data center 701 and external resources and users via the network(s) 709.

The host machines 721a-n can be traditional standalone computing devices and/or they can be configured as individual blades in a rack of many server devices. The host machines 721a-n each have one or more input/output (I/O) connectors. In FIG. 7, the first host machine 721a is shown with an I/O connector 729a, and the Nth host machine 721n is shown with an I/O connector 729n. The I/O connectors 729a-n enable the host machines 721a-n to be placed in electronic communication with each other and with other computing entities in the cloud computing system 700, such as the data center management controller 723.

The host machines 721a-n each include one or more processors, which may be referred to herein as host processors. In FIG. 7, the first host machine 721a is shown with a set of one or more host processors 731a, and the Nth host machine 721n is shown with a set of one or more host processors 731n. The host processors 731a-n can be general purpose single- or multi-chip microprocessors (e.g., an Advanced RISC (Reduced Instruction Set Computer) Machine (ARM)), special purpose microprocessors (e.g., a digital signal processor (DSP)), microcontrollers, programmable gate arrays, and so forth, including combinations thereof. The host processors 731a-n can alternatively be referred to as central processing units (CPUs).

The host machines 721a-n each include storage (e.g., hard disk drives) and memory (e.g., RAM) that can be accessed and used by the host processors and VMs. In FIG. 7, the first host machine 721a is shown with memory 771a-b and storage 773a-b, and the Nth host machine 721n is shown with memory 775a-b and storage 777a-b.

The host machines 721a-n each include an operating system (OS), which may be referred to herein as a host operating system (or host OS). In FIG. 7, the first host machine 721a is shown with a host operating system 733a, and the Nth host machine 721n is shown with a host operating system 733n. The host operating systems 733a-n are executed by the host processors 731a—n, and they support multiple virtual machines. In FIG. 7, the first host machine 721a is shown with a plurality of VMs including a first VM (VM1) 735a, a second VM (VM2) 735b, and an Nth VM (VMn) 735n. The Nth host machine 721n is also shown with a plurality of VMs including a first VM (VM1) 737a, a second VM (VM2) 737b, and an Nth VM (VMn) 737n.

Each VM can run its own operating system. FIG. 7 shows VM1 735a on the first host machine 721a running VM OS1 739a, VM2 735b on the first host machine 721a running VM OS2 739b, and VMn 735n on the first host machine 721a running VM OSn 739n. Similarly, FIG. 7 shows VM1 737a on the Nth host machine 721n running VM OS1 741a, VM2 737b on the Nth host machine 721n running VM OS2 741b, and VMn 737n on the Nth host machine 721n running VM OSn 741n.

In some implementations, the various VM operating systems running on a particular host machine can all be the same operating system. Alternatively, the various VM operating systems running on a particular host machine can include different operating systems. The VM operating systems can be, for example, different versions of the same operating system (e.g., different VMs can be running both current and legacy versions of the same operating system). Alternatively, the VM operating systems on a particular host machine can be provided by different manufacturers.

One or more applications can be running on each VM. FIG. 7 shows VM1 735a on the first host machine 721a running App1 751a and App2 751b, VM2 735b on the first host machine 721a running App1 753a and App2 753b, and VMn 735n on the first host machine 721a running App1 755a and App2 755b. Similarly, FIG. 7 shows VM1 737a on the Nth host machine 721n running App1 757a and App2 757b, VM2 737b on the Nth host machine 721n running App1 759a and App2 759b, and VMn 737n on the Nth host machine 721n running App1 761a and App2 761b.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory can be embodied as random-access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein can be interchanged with one another without departing from the scope of the claims. In other words, unless a specific order of steps, operations, and/or actions is required for the proper functioning of the method that is being described, the order and/or use of specific steps, operations, and/or actions can be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein can be combinable with any element or feature of any other embodiment described herein, where compatible.

The present disclosure can be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method performed by a network stack within a host machine, the computer-implemented method comprising:
   receiving communications from a virtual machine (VM) with an existing physical internet protocol (IP) non-virtual network (non-VNET) address to communicate with other non-VNET VMs in a non-VNET, wherein the VM does not have a VNET address, wherein the VM and the network stack are on the host machine;
   providing a migration assignment with an assigned VNET address to the VM that migrates the VM to a VNET, wherein the VM, in response to the migration assignment, adds the assigned VNET address and becomes a hybrid VNET VM by maintaining the existing physical IP non-VNET address and the assigned VNET address;
   subsequent to the VM becoming the hybrid VNET VM, receiving, at the network stack of the host machine, a first packet processing rule set and a second packet processing rule set, wherein the first packet processing rule set is configured to process a first data packet from the hybrid VNET VM corresponding to a first address space that has been defined for the VNET, and wherein the second packet processing rule set is configured to process second data packets from the migrated non-VNET virtual machine corresponding to a second address space that is distinct from the first address space and that does not overlap with the first address space;
   receiving, at the network stack of the host machine and from the hybrid VNET VM, a first data packet that comprises a first source address and a first destination address, wherein the first source address corresponds to the assigned VNET address for the hybrid VNET VM within the VNET, wherein the first source address enables the hybrid VNET VM to communicate with a first set of VNET VMs on the VNET, and wherein the first destination address corresponds to a first destination VM within the VNET;
   based on determining that the first destination VM belongs to the VNET, encapsulating the first data packet based on encapsulation rules that are specified in a first packet processing rule set;
   receiving, at the network stack of the host machine and from the hybrid VNET VM, a second data packet that comprises a second source address and a second destination address, wherein the second source address corresponds to the existing physical IP address that enables the hybrid VNET VM to continue communicate with a second set of non-VNET VMs on the non-VNET, and wherein the second destination address corresponds to a second destination non-VNET VM within the non-VNET; and
   based on determining that the second destination non-VNET VM does not belong to the VNET, causing the second data packet to be transmitted to the second destination non-VNET VM without encapsulation using the second packet processing rule set.

2. The computer-implemented method of claim 1, wherein:
   the first packet processing rule set comprises the encapsulation rules that specify how the encapsulation should be performed on the first data packet; and
   the second packet processing rule set permits the second data packet to be transmitted without the encapsulation.

3. The computer-implemented method of claim 1, further comprising:
   defining a first address space for the VNET; and
   defining a second address space for non-VNET VMs outside of the VNET, wherein the second address space is distinct from the first address space and does not overlap with the first address space.

4. The computer-implemented method of claim 3, wherein determining that the first destination VM belongs to the VNET comprises determining that the first destination address is included within the first address space.

5. The computer-implemented method of claim 3, wherein determining that the second destination non-VNET VM does not belong to the VNET comprises determining that the second destination address is not included within the first address space.

6. The computer-implemented method of claim 3, wherein determining that the second destination non-VNET VM does not belong to the VNET comprises determining that the second destination address is included within the second address space.

7. The computer-implemented method of claim 1, wherein:
   encapsulating the first data packet forms an encapsulated data packet that includes a header and a payload;
   the header of the encapsulated data packet includes a header source address and a header destination address; and the header source address includes a first existing physical IP non-VNET address.

8. The computer-implemented method of claim 7, wherein:
the first existing physical IP non-VNET address is associated with a first host machine that comprises the hybrid VNET VM;
the header destination address comprises a second existing physical IP non-VNET address;
the second existing physical IP non-VNET address is associated with a second host machine that comprises the second destination non-VNET VM; and
the payload of the encapsulated data packet comprises the first data packet.

9. The computer-implemented method of claim 1, wherein the hybrid VNET VM is running on the host machine.

10. The computer-implemented method of claim 1, wherein the VM is migrated to the VNET and becomes the hybrid VNET VM before the other non-VNET VMs within the non-VNET are migrated to the VNET.

11. A non-transitory computer-readable medium comprising instructions that are executable by one or more processors to cause a network stack within a host machine to perform operations of:
receiving communications from a virtual machine (VM) with an existing physical internet protocol (IP) non-virtual network (non-VNET) address to communicate with other non-VNET VMs in a non-VNET, wherein the VM does not have a VNET address, wherein the VM and the network stack are on the host machine;
providing a migration assignment with an assigned VNET address to the VM that migrates the VM to a VNET, wherein the VM, in response to the migration assignment, adds the assigned VNET address and becomes a hybrid VNET VM by maintaining the existing physical IP non-VNET address and the assigned VNET address;
subsequent to the VM becoming the hybrid VNET VM, receiving, at the network stack of the host machine, a first packet processing rule set and a second packet processing rule set, wherein the first packet processing rule set is configured to process a first data packet from the hybrid VNET VM corresponding to a first address space that has been defined for the VNET, and wherein the second packet processing rule set is configured to process second data packets from the migrated non-VNET virtual machine corresponding to a second address space that is distinct from the first address space and that does not overlap with the first address space;
receiving, at the network stack of the host machine and from the hybrid VNET VM, a first data packet that comprises a first source address and a first destination address, wherein the first source address corresponds to the assigned VNET address for the hybrid VNET VM within the VNET, wherein the first source address enables the hybrid VNET VM to communicate with a first set of VNET VMs on the VNET, and wherein the first destination address corresponds to a first destination VM within the VNET;
based on determining that the first destination VM belongs to the VNET, encapsulating the first data packet based on encapsulation rules that are specified in a first packet processing rule set;
receiving, at the network stack of the host machine and from the hybrid VNET VM, a second data packet that comprises a second source address and a second destination address, wherein the second source address corresponds to the existing physical IP address that enables the hybrid VNET VM to continue communicate with a second set of non-VNET VMs on the non-VNET, and wherein the second destination address corresponds to a second destination non-VNET VM within the non-VNET; and
based on determining that the second destination non-VNET VM does not belong to the VNET, causing the second data packet to be transmitted to the second destination non-VNET VM without encapsulation using the second packet processing rule set.

12. The non-transitory computer-readable medium of claim 11, wherein the operations further include:
defining a first address space for the VNET; and
defining a second address space for non-VNET VMs outside of the VNET, wherein the second address space is distinct from the first address space and does not overlap with the first address space.

13. The non-transitory computer-readable medium of claim 12, wherein determining that the first destination VM belongs to the VNET comprises determining that the first destination address is included within the first address space.

14. The non-transitory computer-readable medium of claim 12, wherein determining that the second destination non-VNET VM does not belong to the VNET comprises determining that the second destination address is not included within the first address space.

15. The non-transitory computer-readable medium of claim 12, wherein determining that the second destination non-VNET VM does not belong to the VNET comprises determining that the second destination address is included within the second address space.

16. The non-transitory computer-readable medium of claim 11, wherein:
encapsulating the first data packet forms an encapsulated data packet that includes a header and a payload;
the header of the encapsulated data packet includes a header source address and a header destination address; and
the header source address includes a first existing physical IP non-VNET address.

17. The non-transitory computer-readable medium of claim 16, wherein:
the first existing physical IP non-VNET address is associated with a first host machine that comprises the hybrid VNET VM;
the header destination address comprises a second existing physical IP non-VNET address;
the second existing physical IP non-VNET address is associated with a second host machine that comprises the second destination non-VNET VM; and
the payload of the encapsulated data packet comprises the first data packet.

18. The non-transitory computer-readable medium of claim 11, wherein the hybrid VNET VM is running on the host machine.

19. A computer-implemented method performed by a network stack within a host machine, the computer-implemented method comprising:
receiving communications from a virtual machine (VM) with an existing physical internet protocol (IP) non-virtual network (non-VNET) address to communicate with other non-VNET VMs in a non-VNET, wherein the VM does not have a VNET address, wherein the VM and the network stack are on the host machine;

providing a migration assignment with an assigned VNET address to the VM that migrates the VM to a VNET, wherein the VM, in response to the migration assignment, adds the assigned VNET address and becomes a hybrid VNET VM having by maintaining the existing physical IP non-VNET address and the assigned VNET address;

subsequent to the VM becoming the hybrid VNET VM, receiving, at the network stack of the host machine, a first packet processing rule set and a second packet processing rule set, wherein the first packet processing rule set is configured to process a first data packet from the hybrid VNET VM corresponding to a first address space that has been defined for the VNET, and wherein the second packet processing rule set is configured to process second data packets from the migrated non-VNET virtual machine corresponding to a second address space that is distinct from the first address space and that does not overlap with the first address space;

receiving, at the network stack of the host machine and from the hybrid VNET VM, a first data packet that comprises a first source address and a first destination address, wherein the first source address corresponds to the assigned VNET address for the hybrid VNET VM within the VNET, wherein the first source address enables the hybrid VNET VM to communicate with a first set of VNET VMs on the VNET, and wherein the first destination address corresponds to a first destination VM within the VNET;

based on determining that the first destination VM belongs to the VNET, causing the first data packet to be transmitted to the first destination VM utilizing a first packet processing rule set;

receiving, at the network stack of the host machine and from the hybrid VNET VM, a second data packet that comprises a second source address and a second destination address, wherein the second source address corresponds to the existing physical IP address that enables the hybrid VNET VM to continue communicate with a second set of non-VNET VMs on the non-VNET, and wherein the second destination address corresponds to a second destination non-VNET VM within the non-VNET; and based on determining that the second destination non-VNET VM does not belong to the VNET, causing the second data packet to be transmitted to the second destination non-VNET VM utilizing the second packet processing rule set.

20. The computer-implemented method of claim 19, wherein:

the first packet processing rule set includes encapsulating the first data packet;

the second packet processing rule set includes not encapsulating the second data packet; and the first packet processing rule set differs from the second packet processing rule set.

* * * * *